Patented Nov. 2, 1937

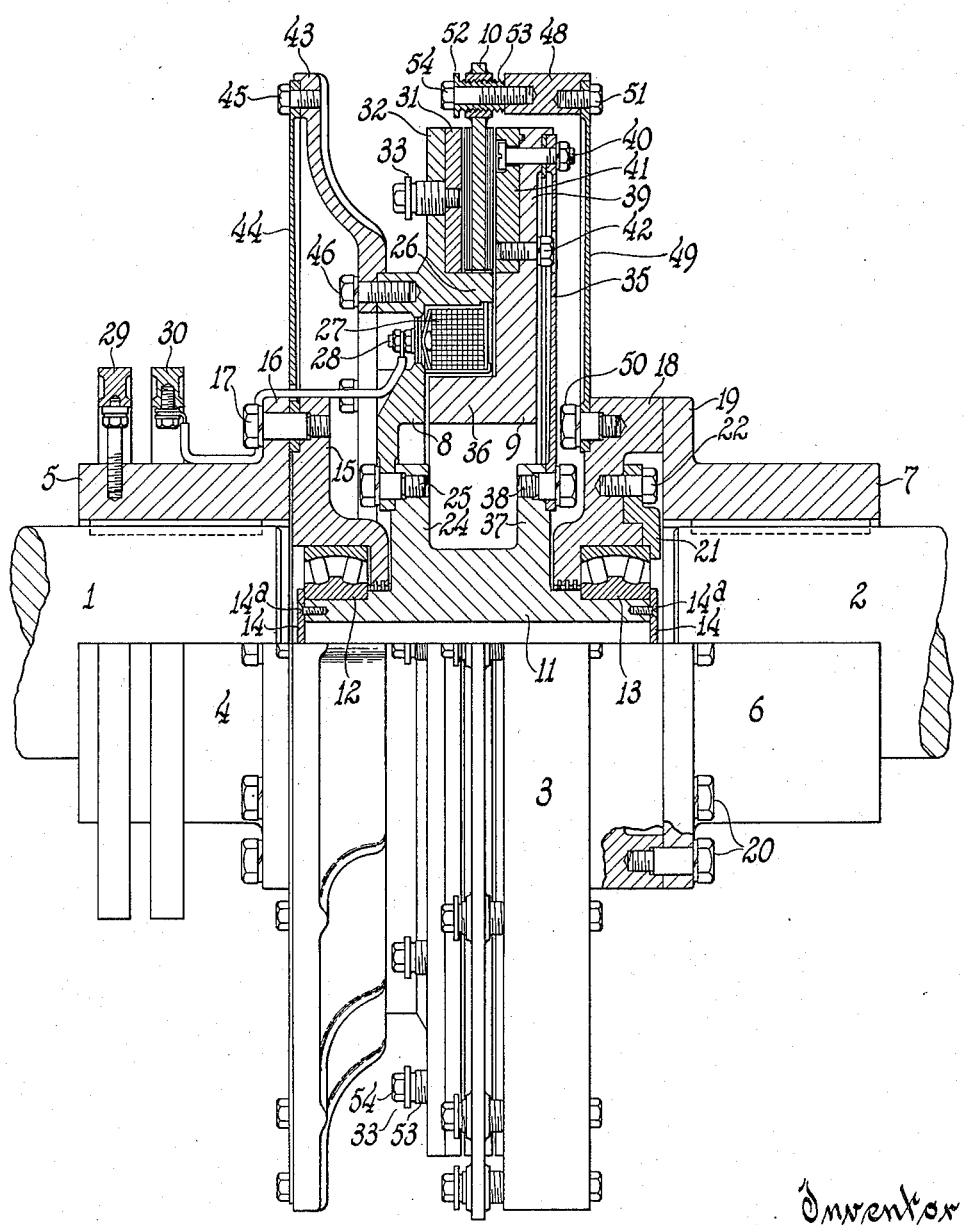

2,097,922

UNITED STATES PATENT OFFICE 2,097,922

ELECTROMAGNETIC CLUTCH

Howard E. Hodgson, Wauwatosa, Wis., assignor to Cutler-Hammer, Inc., Milwaukee, Wis., a corporation of Delaware Application July 6, 1936, Serial No. 89,092

5 Claims. (Cl. 192—84)

This invention relates to improvements in electromagnetic clutches.

An object of the invention is to provide an improved electromagnetic clutch having driving and driven elements which are self-adjusting to compensate for both angular and lateral misalignment of shafts upon which said elements are mounted.

Another object is to provide a clutch of the aforesaid character which can be readily installed between permanently mounted driving and driven shafts and readily removed therefrom.

Another object is to provide a rugged and efficient clutch of the aforesaid character consisting of a relatively small number of parts which can be readily manufactured and assembled.

Various other objects and advantages of the invention will hereinafter appear.

The accompanying drawing illustrates a clutch embodying the invention which will now be described, it being understood that the embodiment illustrated is susceptible of modification without departing from the spirit and scope of the appended claims.

The drawing illustrates spaced shafts 1 and 2 and an electromagnetic clutch 3 mounted therebetween, the upper half of said clutch being shown in section. Said clutch includes a driving element 4 having a hub 5 associated therewith which is keyed to shaft 1 and a driven element 6 having an associated hub 7 keyed to shaft 2. Said driving element includes cooperating field and armature members 8 and 9 and said driven element includes a friction ring 10 to be clamped between friction faces on said field and armature members upon attraction of the latter.

More specifically, the field and armature members 8 and 9 are mounted upon a hollow stub shaft 11 located between the shafts 1 and 2 and having roller bearings 12 and 13 mounted upon opposite ends thereof. The roller bearings 12 and 13 are of a self-adjusting type permitting angular misalignment of stub shaft 11 with respect to shafts 1 and 2 and the inner races thereof are secured to shaft 11 by plates 14 which are fixed to opposite ends of said shaft by screws 14ª. The outer race of roller bearing 12 is mounted within a bored opening in an annular supporting member 15 fixed to a projecting flange 16 on hub 5 by bolts 17. The outer race of roller bearing 13 is mounted within a bored opening in an annular supporting member 18 fixed to an outwardly projecting flange 19 on hub 7 by screws 20. The outer race of roller bearing 12 is slidable within supporting member 15 and the outer race of roller bearing 13 is fixed within supporting member 18 by a retaining ring 21 which is secured to said supporting member by screws 22.

Field member 8 is of annular form and is fixed to an outwardly projecting flange 24 on stub shaft 11 by screws 25. Said field member is provided with an annular pole projection 26 which surrounds an annular magnet coil 27 wound upon a suitable bobbin fixed within said pole projection. Coil 27 is provided with a pair of terminals, one of which is illustrated at 28 in the drawing and said terminals are connected by suitable leads to insulated slip rings 29 and 30 mounted upon hub 5. A friction ring 31 for engaging the left hand face of friction ring 10 is slidably mounted upon the outer surface of pole projection 26 and said friction ring is secured to a peripheral flange 32 on field member 8 by a plurality of adjustable securing devices 33.

Armature member 9 is secured to stub shaft 11 through the medium of an annular spring disk 35 and is provided with an annular pole projection 36 which projects into the opening in coil 27. Spring disk 35 is secured adjacent its inner edge to a flange 37 on stub shaft 11 by screws 38 and said disk is secured adjacent its outer edge to a peripheral flange 39 on armature member 9 by bolts 40. A friction ring 41, for engaging the right hand face of friction ring 10 is secured to flange 39 by the bolts 40 and also by screws 42.

Field member 8 is connected to hub 5 to rotate therewith by an annular coupling member 43 and an annular spring disk 44. Coupling member 43 and spring disk 44 are secured together adjacent their outer edges by screws 45. Coupling member 43 is secured adjacent its inner edge to field member 8 by screws 46 and the inner portion of spring disk 44 is clamped between the flange 16 on hub 5 and member 15 by the screws 17.

Friction ring 10 has friction linings secured to the opposite faces thereof, and the same is secured to a ring member 48 which is carried by an annular spring disk 49 secured to the supporting member 18. Spring disk 49 is secured adjacent its inner edge to member 18 by screws 50 and ring member 48 is fixed to said disk adjacent the periphery thereof by screws 51. Friction ring 10 is secured to ring member 48 by a plurality of adjustable securing devices 52.

The adjustable securing devices 52 and 33 associated with friction rings 10 and 31 are of similar construction and each includes a screw plug 53 and a cap screw 54 rotatable within an opening in said plug. The plugs 53 of securing devices 52 are screwed into threaded openings in friction ring 10 and their associated cap screws 54 are screwed into ring member 48 to clamp said plugs against said ring member. By loosening the cap screws 54 of devices 52 the plugs 53 can be rotated to vary the position of friction ring 10 with respect to ring member 48. The plugs 53 of securing devices 33 are screwed into threaded openings in flange 32 of field member 8 and their associated cap screws 54 are threaded into friction ring 31 and serve to clamp said friction ring against the inner ends of said plugs. By loosening cap screws 54 of devices 33 the plugs 53 can be adjusted to vary the position of friction ring 31 with respect to flange 32.

With the parts arranged as hereinbefore described the driving parts of the clutch including field member 8, armature member 9 and stub shaft 11 are driven from shaft 1 through the medium of spring disk 44. When winding 27 is deenergized friction ring 10 is held out of engagement with friction ring 31 on field member 8 by spring disk 49 and friction ring 41 on armature member 9 is held out of engagement with friction ring 10 by spring disk 35. The driven shaft 2 is thus normally released from the driving shaft 1. Upon energization of winding 27 armature member 9 moves into an attracted position and friction ring 10 is clamped between friction rings 31 and 41 to establish a driving connection between shafts 1 and 2.

In connection with the foregoing it should be noted that spring disk 44 is adapted to yield to permit angular misalignment of stub shaft 11 and the parts carried thereby with respect to shaft 1 upon lateral misalignment of shafts 1 and 2. Also it should be noted that shaft 2 is free to assume an angular position with respect to stub shaft 11 upon angular or lateral misalignment of shafts 1 and 2. Upon misalignment of stub shaft 11 with respect to either of the shafts 1 and 2 the driven friction ring 10 will be disposed at an angle with respect to the driving friction rings 31 and 41 when the clutch is released. However, sufficient clearance is provided between the driving friction rings 31 and 41 to prevent engagement of the driven friction ring 10 with either of the same when the clutch is released. Upon energization of the clutch friction ring 10 is clamped between the cooperating friction rings 31 and 41 as hereinbefore set forth, and as is apparent if the shafts 1 and 2 are misaligned the spring disk 49 will yield to permit alignment of the cooperating faces of said friction rings.

It should also be noted in connection with the foregoing that the entire weight of the driving parts of the clutch is supported between shafts 1 and 2 by the stub shaft 11. Furthermore it should be noted that upon removal of the bolts 17 and 20, the driving element of the clutch together with stub shaft 11 and the spring disks 44 and 35 can be removed as a unit without disturbing the mounting of shafts 1 and 2.

What I claim as new and desire to secure by Letters Patent is:

1. The combination with a pair of axially spaced shafts, of a member supported at opposite ends by said shafts and permitting misalignment of said shafts and also relative rotation thereof, and an electromagnetic clutch having cooperating driving and driven elements, said driving element being carried by said member, and having a flexible driving connection between the same and one of said shafts and said driven element having a flexible driving connection between the same and the other of said shafts and being supported by said latter shaft.

2. The combination with a pair of axially spaced shafts, of a member supported at opposite ends by said shafts and permitting misalignment of said shafts and also relative rotation thereof, a spring disk fixed to each of said shafts and an electromagnetic clutch located between said shafts and having driving and driven elements connected to said shafts through the medium of said spring disks, said driving element being supported by said member.

3. The combination with a pair of axially spaced shafts, of an electromagnetic clutch located in the space between said shafts and including driving and driven elements, said driving element being supported by both of said shafts and having a flexible driving connection between the same and one of said shafts, and said driven element having a flexible driving connection between the same and the other of said shafts and being supported by said latter shaft.

4. The combination with a pair of axially spaced shafts, of a spring disk fixed to each of said shafts, an electromagnetic clutch arranged between said spring disks, said clutch including cooperating field and armature members connected to one of said shafts through the medium of the spring disk associated therewith, and a friction part to be clamped between said field and armature members and connected to the other of said shafts through the medium of the spring disk associated with said shaft, and means for supporting said field and armature members between the opposing ends of said shafts, said means permitting relative rotation of said shafts and also misalignment thereof.

5. The combination with a pair of axially spaced shafts, of a supporting member supported at opposite ends by said shafts and permitting misalignment of said shafts and also relative rotation thereof, a spring disk fixed to each of said shafts and an electromagnetic clutch arranged between said spring disks, said clutch including cooperating field and armature members and a friction part to be clamped between said members, said field member being fixed to said supporting member and being fixed to one of said spring disks and said friction part being fixed to the other of said spring disks, and a spring disk driving connection between said supporting member and said armature member.

HOWARD E. HODGSON.